United States Patent Office 2,856,277
Patented Oct. 14, 1958

2,856,277
METHOD OF DEFOLIATING PLANTS

Henry Bluestone, Cleveland Heights, and Jamal Zaki Shahabeddin, Painesville, Ohio; said Jamal Zaki Shahabeddin, now by change of name Jamal Shahab Eden, assignors to Diamond Alkali Company, Cleveland, Ohio, a corporation of Delaware No Drawing. Application March 29, 1954
Serial No. 419,588

6 Claims. (Cl. 71—2.5)

This invention relates to improvements in plant treating materials, and more particularly relates to improved compositions and to methods for their use.

In recent years, there has been considerable use of chemicals to defoliate various plants including, among others, cotton and soy bean. Defoliation of plants offers certain advantages. For example, in defoliated cotton, the resultant increased exposure to sun and the drying action of air movement cause mature bolls to open faster. Moreover, defoliation prevents or reduces boll rot and, in addition, retards seed and fiber deterioration.

Cotton defoliation also has the advantage of preventing difficulties heretofore caused when the cotton leaves are crushed into the cotton, thereby leaving objectionable stains. Another difficulty heretofore encountered is the problem of removing dried leaves, which are carried along to the cotton gin with the bolls.

Although the defoliation of various plants is desirable when the crop is harvested by hand, since picking becomes easier and more comfortable, defoliation is particularly advantageous when mechanical pickers or harvesters are employed. Defoliated plants are free from leaves which would otherwise clog spindles of mechanical pickers or add to the trash which must be separated from the desired plant portion being harvested. In addition, when leaves are removed, the operator of the mechanical picker has a better view of the plant to be harvested, and is enabled to more easily position the machine over the plants.

Various chemical compounds have been heretofore suggested and used, in some instances on a rather large scale in the defoliation of cotton and other plants. Typical of prior defoliants are calcium cyanamid, monosodium cyanamid, potassium cyanate, sodium chlorate, sodium dichromate, pentachlorophenol, sodium pentaborate, sodium monochloroacetate, and magnesium chlorate hexahydrate. While, in many instances, these defoliants have been satisfactory in leaf removal, their use has not been a complete solution to the problem of defoliation. One of the difficulties encountered generally with prior defoliants has been a strong plant tissue destruction and, in many instances, the phenomenon of leaf burning with resultant leaf and plant brittleness.

Accordingly, it is the principal object of the present invention to avoid the difficulties encountered with prior defoliant compositions and to provide new and improved defoliant materials and methods for their use.

Another object of the present invention is the provision of improved defoliant compositions which are highly specific in their action as defoliants.

Another object is the provision of an improved plant treatment material effective both as a defoliant and an insecticide.

A further object of this invention is the provision of highly effective defoliant compositions which may be applied in a systemic manner or directly to the plant foliage.

These and other objects and advantages of the invention will appear more fully from the description hereinafter.

As used herein, unless otherwise indicated, the term "plant" includes all portions of the plant, such as the roots, stems, leaves, fruits, seeds, and blossoms.

The present invention contemplates a method of modifying the normal growth and life characteristics of a plant by contacting the plant with a composition comprising as an active ingredient a compound of the following formula

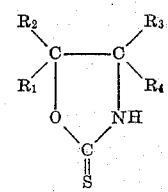

wherein $R_1$, $R_2$, $R_3$, and $R_4$ may be hydrogen or substituted and/or unsubstituted hydrocarbon radicals, including alkyl radicals, such as methyl, ethyl, propyl, butyl, and their isomers, as well as aryl, such as substituted or unsubstituted phenyl or naphthyl radicals, alkaryl, such as tolyl or xylyl radicals, and aralkyl radicals, such as benzyl or phenethyl radicals, as well as halogen substituted derivatives of the foregoing.

The compounds of this invention may also be described as substituted or unsubstituted 2-mercaptooxazolines, or oxazolidine-2-thiones, since the two tautomers

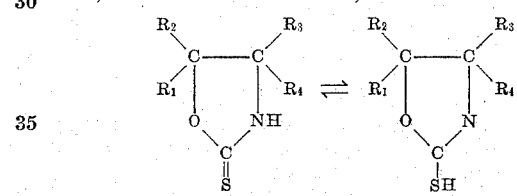

are equivalent for the purposes of this invention.

By the practice of the present invention it has been discovered that improved defoliation is obtained when a plant is treated with a liquid composition of this invention by spraying, drenching, or immersing or with a powder composition embodying the present invention, or by applying such a composition to the soil, the defoliant action being obtained by absorption through the plant's roots and subsequent translocation through the plant circulatory system. Such latter "systemic" action is particularly advantageous in those instances where rainfall would tend to remove defoliants applied externally to the plant foliage. In any type of application, compositions embodying the present invention are singularly specific in their action as defoliants in causing abscission of the plant leaves from the stems.

In addition to the foregoing advantages as defoliants, compositions embodying this invention are also useful in the treatment of grain crops to harden them to maturity before frost when planted late in the season. For example, such compositions are useful in hardening to maturity an alfalfa crop planted after winter wheat of the preceding year. Another application of compositions of this invention is the treatment of nursery stock to force maturity and dormancy of the stock to provide a longer growing and harvesting season.

Surprisingly, the compounds of the present invention also exhibit, in addition to a singular defoliating action, excellent insecticidal properties. More particularly, such compounds are effective in the control of such insects as the southern army worm and the Mexican bean beetle, both of which are typical of insect pests which attack plant foliage and cause much damage. Hence, compounds embodying the present invention provide a unique combination of insecticidal and specific defoliant properties not found in prior plant treating materials.

Specific illustrative examples of compounds embodying the present invention include:

OXAZOLIDINE-2-THIONE

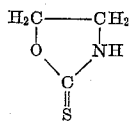

5-METHYL-OXAZOLIDINE-2-THIONE

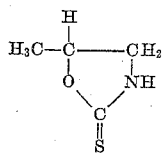

4,4-DIMETHYL-OXAZOLIDINE-2-THIONE

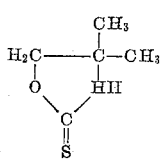

and

4-ETHYL-OXAZOLIDINE-2-THIONE

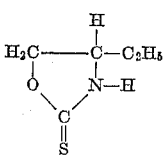

Synthesis of the compounds useful in the practice of the present invention can be accomplished by reacting a 1,2-amino alcohol with carbon disulfide in an alcoholic solution to obtain a heterocyclic structure containing as substituents therein the groups present in the amino alcohol.

It will be understood, of course, in the preparation of the active compounds employed in the practice of the present invention that a pure compound is not necessarily isolated at each step in the process and that purification of both intermediate and final products is generally practicable only to the extent necessary for removing by-products and impurities which otherwise would adversely affect the reaction yield or deleteriously affect the plants to which the materials are applied.

In order that those skilled in the art may better understand the practice of the present invention and in what manner it may be carried into effect, although the methods of synthesis described are not to be construed as the only suitable methods of preparation, the following examples illustrate the preparation of the compounds embodying the invention and their use.

EXAMPLE I

Part A

*Oxazolidine-2-thione.*—3.2 mols (195 grams) of ethanolamine is dissolved in 500 ml. of methanol and the solution is cooled in an ice bath to 0° C. To this solution, 3.3 mols (250 grams) of carbon disulfide is added slowly over a period of 3 hours. To the resulting mixture a methanolic solution of iodine (1 ml. methanol per 0.150 gram iodine) is added from a separatory funnel until the mixture acquires a faint permanent yellow color. The thiuram disulfide derivative is precipitated during the addition of the iodine solution and is washed several times with methanol.

150 grams of the product, bis (2-hydroxy-ethyl)-thiuram disulfide is added to 2250 ml. of water. The mixture is gradually heated for 1½ hours to its boiling point, the hot solution slightly acidified with dilute sulfuric acid and cooled. The solution is filtered to remove suspended sulfur, the filtrate is saturated with sodium chloride, and then extracted six times with 500 ml. portions of ethyl acetate. The ethyl acetate is concentrated on a steam bath, petroleum ether is added, and the mixture cooled. A white solid, oxazolidine-2-thione, separates. The product weighs 33.5 grams and has a melting point range of 99° to 101° C.

Part B

The product of Part A is applied to bean plants at a dosage of 150 mg. per plant in a 4-inch diameter pot. That the compound exhibits excellent defoliating properties is evidenced by the fact that most of the plant leaves are removed in four days.

Part C

The product obtained according to the method of Part A is formulated into a wettable powder containing 25% by weight of the product as an active ingredient. The powder is dispersed in water (1% by weight active ingredient) and is applied to cranberry bean plants by dipping the plants into the dispersion. After the treated plants have dried, untreated Mexican bean beetles are caged thereon. After 48 hours, 60% insect mortality is observed. Similar tests with the southern army worm produce a 100% insect kill.

EXAMPLE II

Part A

*5-methyl-oxazolidine-2-thione.*—228 grams of monoisopropanolamine is dissolved in 600 ml. of methanol and cooled in an ice bath to 0° C. 240 ml. of carbon disulfide is then added slowly with constant stirring. To the resultant solution a methanolic solution of iodine (190.5 grams iodine in 1270 ml. methanol) is added from a dropping funnel to produce a faint permanent yellow color in the mixture. The reaction mixture is then allowed to warm up to room temperature. After several hours, solid needle-like crystals separate.

Subsequent evaporation of methanol is carried out to produce a further yield of crystals. The combined product is placed in a 3-liter, round-bottomed flask with 2 liters of water. The material is gradually heated to boiling and acidified with dilute sulfuric acid. The solution is then cooled, and the sulfur which forms is filtered off. The filtrate is saturated with sodium chloride. Part of the product separates as a solid from the saturated sodium chloride solution and is removed by filtration, dissolved in benzene, and reprecipitated with petroleum ether. After drying, it has a melting point range from 65° to 68° C. The product is then reprecipitated twice from benzene solution by the addition of petroleum ether. This produces 69 grams of 5-methyl-3-oxazolidine-2-thione having a melting point range of 74° to 76° C.

Part B

The 5-methyl-3-oxazolidine-2-thione of Part A is applied to bean plants as a systemic defoliant in a dosage of 150 mg. per plant in a 4-inch diameter pot. Excellent defoliation is obtained.

Part C

The product of Part A is formulated into a wettable powder containing 25% by weight of the product as an active ingredient. This powder is dispersed in water (1% by weight active ingredient) and is applied to cranberry bean plants by dipping the plants into the dispersion. After the treated plants have dried, untreated Mexican bean beetles are caged thereon. After 48 hours, 50% insect mortality is observed. Similar tests with the southern army worm produce a 100% insect kill.

EXAMPLE III

Part A

*4,4-dimethyl-oxazolidine-2-thione.*—75 grams of 2-amino-2-methyl-1-propanol and 114 grams of carbon disulfide are mixed, while cooling and stirring, at a temperature between 0° and 5° C. To the resultant solution 84 grams of potassium hydroxide dissolved in 450 ml. of ethanol and 60 ml. of water is added. This mixture is then refluxed for 6 hours. A solid material separates from the reaction mixture and is removed by filtration. It is dissolved in benzene and reprecipitated by addition of petroleum ether to yield 46 grams of white crystals of 4,4-dimethyl-oxazolidine-2-thione having a melting point range of 123.5° to 125° C.

Part B

The product is applied to bean plants in a dosage of 150 mg. per plant in a 4-inch diameter pot. That the compound exhibits excellent defoliating properties is evidenced by the fact that the plant leaves are removed in four days.

Part C

The product obtained according to Part A is formulated into a wettable powder containing 25% by weight of the product as an active ingredient. The powder is dispersed in water (1% by weight active ingredient) and is applied to cranberry bean plants by dipping the plants therein. After the treated plants have dried, untreated Mexican bean beetles are caged thereon. After 48 hours, 80% insect mortality is observed. Similar tests with the southern army worm produce a 100% insect kill.

EXAMPLE IV

*4-ethyl-oxazolidine-2-thione.*—3 mols (267 grams) of 2-amino-1-butanol and 500 ml. of methanol are placed in a 3-necked, round-bottomed flask fitted with a thermometer, stirrer, and dropping funnel. The mixture is cooled to 0° C., and 3 mols (228 grams) of carbon disulfide added dropwise over a period of three hours. To the resultant mixture a solution of 190.5 grams of iodine in 1270 ml. of methanol is added from a dropping funnel until a faint permanent yellow color is produced in the solution.

Most of the methanol is then evaporated under reduced pressure. The resulting thiuram disulfide, suspended in the methanol, is added to 2 liters of water. This mixture is then gradually heated to boiling over a period of 1½ hours with continuous stirring. While boiling, the solution is acidified with dilute sulfuric acid and is cooled. The suspended sulfur is then filtered off and the solution is saturated with sodium chloride. A brown oil separates and is collected and weighs 97 grams. The oil is then chilled in an ice bath until it solidifies as a brown solid, which is recrystallized twice from isopropanol to give a yellowish crystalline solid weighing 38 grams and having a melting point range of 72.5° to 75° C. An additional 53 grams of brown oil is obtained by extracting the saturated saline aqueous phase with ethyl acetate. On similar purification treatment 43 grams of recrystallized solid, melting at 73° to 75° C., is obtained. The product is then applied as a bean plant defoliant with excellent results, as in the foregoing examples.

It will be understood, of course, that compounds embodying the present invention may be employed either alone or in mixtures containing one or more of the compounds as active ingredients, with or without small amounts of wetting agents added.

Typical of suitable wetting agents are the following commercially available trade-name products: Igepal CO-880 (alkyl phenoxypolyoxyethylene ethanol), Arquad 2-C (quaternary ammonium compound of the formula RR'—N—(CH$_3$)$_2$Cl), Emulphor ON-870 (polyoxyethylated fatty alcohol), Tween 80 (polyoxyethylene sorbitan monooleate), Triton X-155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F-68 (condensate of ethylene oxide with an hydrophobic base formed by condensing propylene oxide with propylene glycol), Antarox A-400 (alkyl phenoxypolyoxyethylene ethanol), Triton X-120 (alkyl aryl polyether alcohol), Nacconol NRSF (alkyl aryl sulfonate), Aresol OS (isopropyl naphthylene sodium sulfonate), Span 40 (sorbitan monopalmitate), Triton B-1956 (modified phthalic glycerol alkyd resin), and Antarox B-290 (polyoxyethylated vegetable oil). At present, a preferred wetting agent is the non-ionic material Igepal CO-880 employed in an amount of about 0.1% by weight based on the amount of liquid present.

It will be understood, of course, that compounds embodying the present invention, are effective when applied to plants systemically, i. e., via root absorption, or in a direct manner, as by spraying, sprinkling, or drenching the plant with a solution of the compound, or by dusting with a dry material containing a compound of the present invention as an active ingredient, or by applying a slurry containing a compound of the present invention as an active ingredient.

Although compounds embodying the present invention may be employed as wettable powders, with or without diluents and/or extenders or other modifying ingredients, including such things as insecticides or other plant treating agents, a typical application utilizes compounds of the present invention in the form of a liquid spray in a concentration of about 0.5% by weight. In such a spray material water is, of course, a satisfactory liquid, although other liquids also may be employed.

While there have been described various embodiments of the invention, the methods and products described are not intended to be understood as limiting the scope of the invention, as it is realized that changes therewithin are possible, it being intended to cover the invention broadly in whatever form its principle may be utilized.

What is claimed is:

1. A method of defoliating plants which comprises applying thereto in an amount sufficient to effect the desired defoliation a compound having the formula

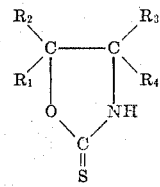

wherein $R_1$, $R_2$, $R_3$, and $R_4$ are selected from the group consisting of hydrogen, alkyl, aryl, alkaryl, and aralkyl radicals, wherein the alkyl substituent contains from 1 to 4 carbon atoms, inclusive.

2. A method of defoliating plants which comprises applying thereto a material including as an active ingredient in an amount sufficient to effect the desired defoliation a compound having the formula

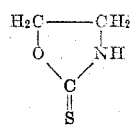

3. The method of claim 1 in which there is also employed with said compound a small amount of a wetting agent.

4. A method of defoliating plants which comprises applying thereto a material including as an active ingredient in an amount sufficient to effect the desired defoliation a compound having the the formula

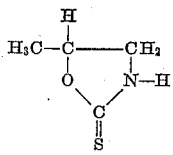

5. A method of defoliating plants which comprises applying thereto a material including as an active ingredient in an amount sufficient to effect the desired defoliation a compound having the formula

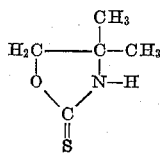

6. A method of defoliating plants which comprises applying thereto a material including as an active ingredient in an amount sufficient to effect the desired defoliation a compound having the formula

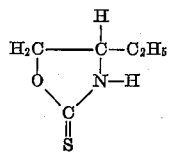

References Cited in the file of this patent

UNITED STATES PATENTS 2,282,931    Bruson _____ May 12, 1942
2,525,200    Bergmann _____ Oct. 10, 1950

OTHER REFERENCES

Ettlinger: Chem. Abstracts, vol. 45, cols. 3381–2 (1951).

Viscontini et al.: Chem. Abstracts, vol. 46, col. 3531 (1952).

Rosen: Chem. Abstracts, vol. 47, col. 9964 (1953). (Citing J. A. C. S. article with 1952 date.)

Ettlinger, in J. Am. Chem. Soc., vol. 72, pages 4792 to 4796 incl. (1950).

Rosen, in J. Am. Chem. Soc., vol. 74, pages 2994 to 2997 incl. (1952).

Wiley et al., in Chemical Reviews, vol. 44, June 1949; pages 447 to 476 incl.